June 16, 1953 J. T. ANDERSON 2,642,234

SYNCHRONIZER

Filed March 4, 1949 2 Sheets-Sheet 1

INVENTOR.
JOHN T. ANDERSON
BY [signature]
ATTORNEY

INVENTOR.
JOHN T. ANDERSON
BY
ATTORNEY

Patented June 16, 1953 2,642,234

UNITED STATES PATENT OFFICE 2,642,234

SYNCHRONIZER

John T. Anderson, Portland, Oreg.

Application March 4, 1949, Serial No. 79,699

3 Claims. (Cl. 242—55)

This invention relates to a synchronizing device, which is particularly adapted for synchronizing of wire or tape recording machines with motion picture projecting machines.

The primary object of the invention is to synchronize a wire or tape recording machine to a motion picture projector while recording commentation on the wire of the recorder to correspond with the picture being projected by the projector.

Another object of the invention is to synchronize the recorder to the projector while projecting the pictures so that the commentation previously recorded will co-incide with the projection of the said pictures.

A further object of the invention is to provide a synchronizer that when attached to the recorder and the projector, no alterations will have been made in either the recorder or the projector.

When the synchronizer is installed on the recorder and the projector, it is done from outside of these two machines without having to go into the inside mechanism of either.

A still further object of the invention is to apply the synchronizer to both machines allowing these machines to operate under their own operating power.

And a further object of the invention is to provide means of correcting the synchronized operation of the recorder with the projector while the machines are in operation.

These and other incidental objects will be apparent in the drawings, specification and claims.

Referring to the drawings.

Figures 1, 2:
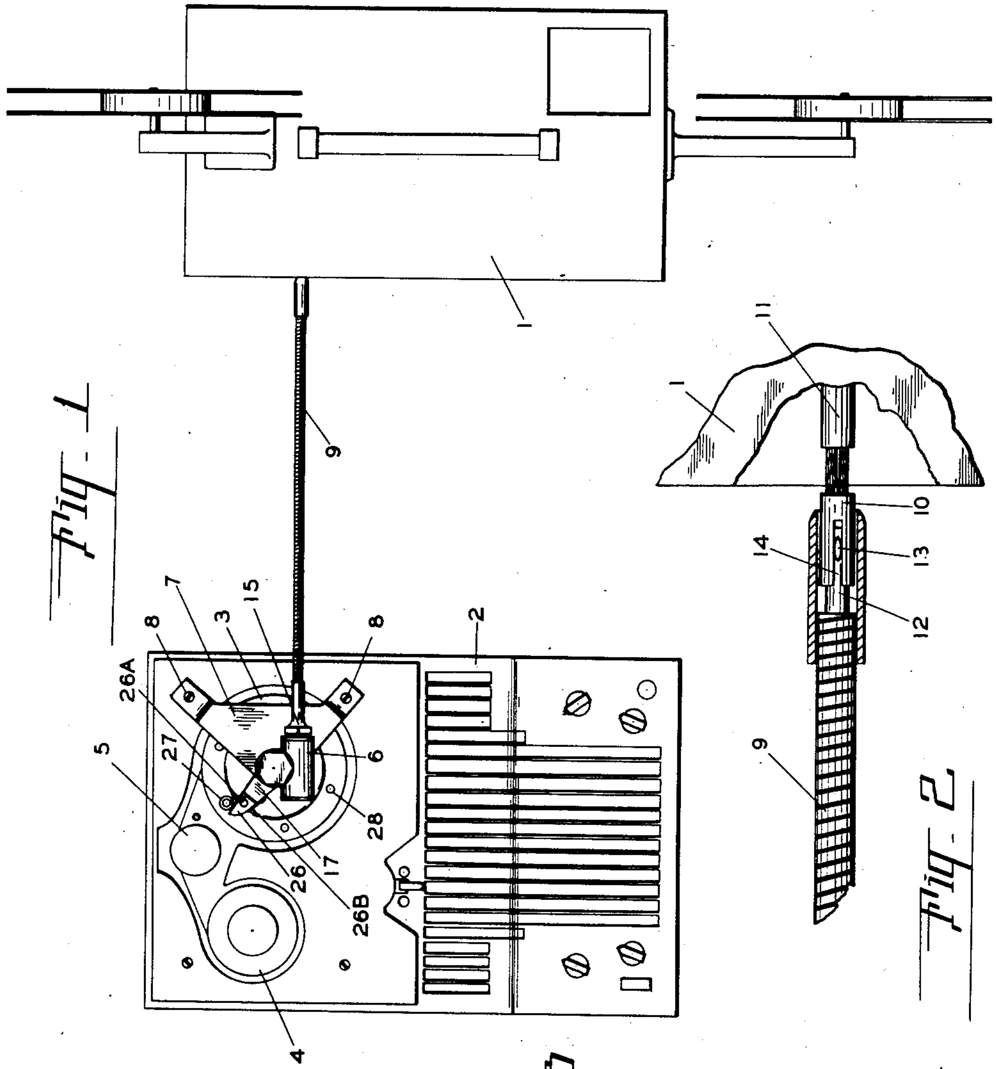
Figure 1 is a plan view of a motion picture projector having a standard wire recorder connected thereto by my new and improved synchronizing device.
Figure 2 is an enlarged detail fragmentary view illustrating a typical connection of the synchronizer device to a rotating shaft of the projector.

Referring more specifically to the drawings:

In Figure 1 I illustrate a motion picture projector 1 and a typical wire recorder 2, although I do not wish to limit the recorder to a wire recorder, as the invention is equally well adapted to tape or disk recorders.

In the wire recorder illustrated, which is typical of all wire recorders, a winding drum 3 is revolved by a motor within the recorder through a system of friction drives. The winding drum 3 receives the wire from the spool of wire 4 leading the same through the recording head 5, through which the recording is placed on the wire by magnetic means, and received from the wire and amplified through the recording machine, which may be further amplified through the amplifier of the motion picture machine.

The operation of motion picture projectors is of well known practice, therefore, I need not go into the detail of the picture machine, except that it is the object of the invention to keep the winding drum 3 of the recorder in synchronism with the film driving mechanism within the projector, so that the wire and the film will have a definite synchronization relative to one another. This is accomplished by temporarily driving the winding drum 3 of the recorder slightly faster than it is being driven by its own motive power when the drum 3 slows down below the synchronizing speed range. This is easily done due to the fact that within the wire recorder the electric motor drives the winding drum through a series of friction drums.

My synchronizing device comprises a gear box 6 mounted upon a bracket 7, which is secured to the recorder by the screws 8, which are originally on the recorder. This gear box contains the gear ratio related to the particular picture machine being synchronized with the recorder. The gear ratio will depend upon the particular shaft within the projector that the synchronizer is being geared to.

In some projectors the drive is taken off of the film sprockets, in this case it is almost a direct drive to the winding drum of the recorder, but in other cases the synchronizer is driven from the motor shaft of the projector or other intermediate drive. In either case the gear ratio within the gear box will be changed to drive the winding drum 3 of the recorder slightly faster than its own drive.

I preferably employ a flexible drive shaft 9 for driving the synchronizer from the projector. Referring to Figure 2 I illustrate a special fitting 10, which is pressed into one of the rotating shafts 11 of the projector. I do not wish to be limited to how this fitting is applied to the projector shaft, as there are many ways of doing this, as for instance pressing the same in as illustrated or threading the same on to shafts or various other ways.

The driving shaft 12 of the flexible driving cable 9 enters the adapter 10 as illustrated, having a key 13 associated with the slot 14 for rotating the same. The opposite end 15 of the flexible driving shaft is secured to the gear assembly 6 by any suitable conventional method, and as a matter of fact, I have found that standard speedometer drive gears and cables are admirably adapted for carrying out the object of my invention.

Figures 3, 4, 5, 6:
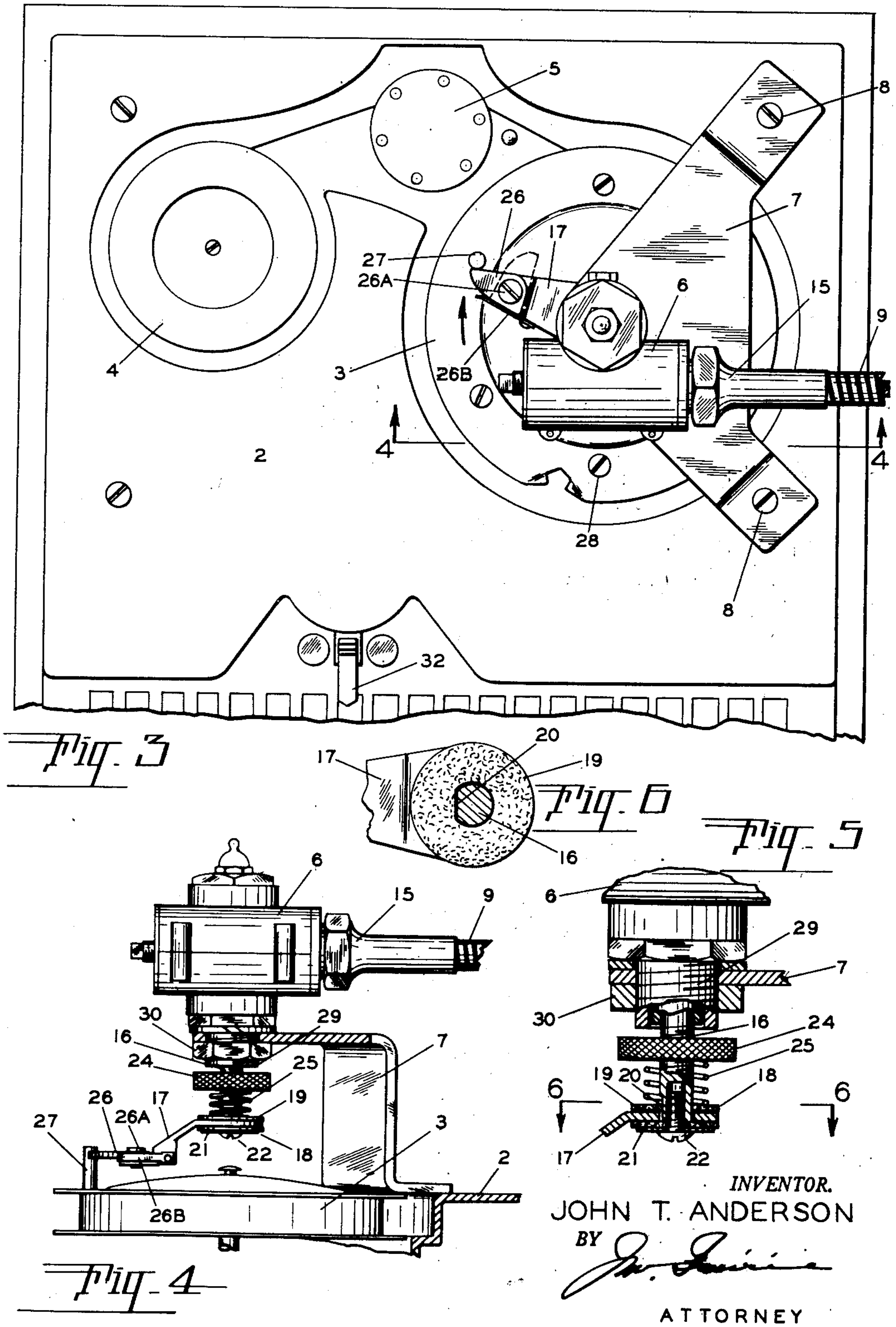
Figure 3 is a fragmentary plan view of a conventional wire recorder having my new and improved synchronizing device mounted thereon.
Figure 4 is a side sectional view of my new and improved synchronizer taken on line 4—4 of Figure 3.
Figure 5 is an enlarged detail sectional view of the vertical drive shaft, forming part of the synchronizer and its associated parts.
Figure 6 is a detail end sectional view taken on line 6—6 of Figure 5.

The driven shaft 16, referring to Figures 4 and 5, is adapted to rotate a crank arm 17 through a flexible clutch assembly 18, which consists of a friction disk 19 slidably mounted on the shaft 16 being prevented from turning thereon by a key way 20. The friction disk 21 is maintained against the end of the shaft by the cap screw 22. These friction disks insure a smooth frictional engagement against the crank arm 17 rotating the said arm. The driving shaft 16 is threaded and has an adjusting nut 24, which is adjusted against the spring 25, which applies a variable pressure against the friction disk 19, determining the amount of slip between the driving shaft 16 and the crank arm 17. The object of this slipping clutch assembly 18 will be apparent later on in the specification.

Pivotally mounted to the crank arms 17 is a pawl 26, referring to Figures 3 and 4 particularly. This pawl engages the post 27 which takes the place of one of the screws 28 on the winding drum. When the drum 3 plows down below the proper speed range, it is rotated temporarily by the arm 17, pawl 26 and post 27.

The gear box 6 is mounted to the bracket 7 by the extension hub 29, which forms a part of the gear box unit. This hub is threaded, having a locking nut 30 applied thereon for clamping the hub to the bracket 7, best illustrated in Figure 5.

I will now explain the operation of my new and improved synchronizing device. The film to which a recording is to be made in synchronism with the recorder is placed on the projector, the recorder is operated in its normal fashion recording the commentation through the microphone which will be recorded on the wire in the usual manner, the projector and the recorder will start simultaneously by their respective electric switches, the projector will temporarily drive the winding drum 3 of the recorder slightly faster than the drive within the recorder in the event that the speed of the drum falls below normal, and as the recording is being made there is a synchronizing effect between the projector and the recorder.

Figure 7:
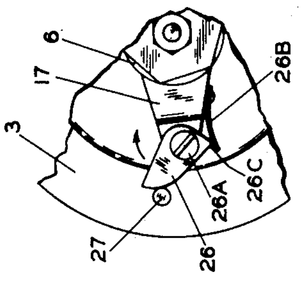
Figure 7 is a fragmentary detail view illustrating the over running of the wire winding drum relative to the driving arm of the synchronizer.

In the event that the electric energy should be shut off or the projector stopped before the recorder, the pawl 26 will take the position as illustrated in Figure 7 permitting the recorder winding drum to keep on rotating preventing the wire from becoming tangled, as any sudden stop to the winding drum would cause piling up of the wire. The operation of the pawl permits the momentum of the motor of the recorder to bring the winding drum and the spool 4 to a normal stop. This is an important feature.

When the recorder is inactive and its switch is in off position, brakes are applied to the winding drum 3 or to the spool 4 so that in the event the projector would be started without throwing the recorder switch on I have provided a slipping clutch assembly 18 relative to the driving shaft 16 and the crank arm 17. The slipping of this clutch protects the recorder assembly and its wire. This is also an important feature in the successful operation of my synchronizer.

Figure 8:
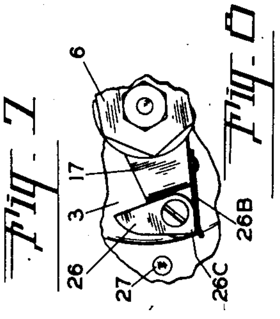
Figure 8 illustrates the same as Figure 7 except that the pawl on the driving arm of the synchronizer is being held out of engagement with the winding drum of the recorder.

When it is desired to rewind the wire on the recorder the pawl 26 is placed in the position, Figure 8, and the recorder then can be rewound in its normal manner. This again is another important feature of the pawl 26 relative to the crank arm 17.

In the normal operation of my synchronizer, as stated above the projector switch and the recorder switch are thrown into operation, although the projector can be started slightly in advance of the recorder due to the fact that the slipping clutch assembly 18 will slip against the brake system of the recorder until the recorder switch is thrown on.

Referring in detail to the pawl 26, the said pawl is pivotally mounted to the crank arm 17 by the pivot pin 26A and is held in extended position by the action of the spring 26B engaging the cam portion 26C of the pawl 26, referring particularly to Figures 3 and 7. This pawl is held in the position shown in Figure 8 by the action of the spring 26B engaging the portion 26C as shown. This is the position for rewinding the winding drum and the pawl is placed in this position manually.

When the pawl is in the position shown in Figure 7, the same will move as illustrated allowing the post 27 to pass after which the pawl will snap back into extended position ready to engage the post again.

In the event the motion picture machine is found to be leading the recorder, as for instance if in the starting of the two machines the projector was fast, the switch on the picture machine can be opened permitting the winding drum on the recorder to keep on rotating, ratcheting past the pawl 26 until the correction has been made, at which time the picture machine is again switched on.

In the event that the recorder is leading, the projector lever 32 on the recorder is moved to center position as illustrated in the drawings, Figure 3. This throws out the clutch in the recorder, not here shown, and applies the brake on the drum 4. The clutch assembly 18 will then slip allowing the picture machine to run forward until the lever 32 is again thrown into operation, bringing the two machines into synchronism.

The operation of the slipping clutch assembly 18 and the action of the pawl 26 relative to the winding drum 3 of the recorder not only provides for temporarily driving the drum slightly faster by the projector, but will permit correction in the synchronization between the film and the wire depending upon which is leading the other, by simply operating the switches on either the projector or the recorder. This is an outstanding feature, and a very important one.

Summing up my invention, the primary feature resides in temporarily driving of the winding drum on a recording machine slightly faster beyond its own power when its normal rate is retarded, but in timed relation to the projector, and by so synchronizing the projector and the recording machine in this manner, no alterations whatever are necessary in the adapting of my synchronizer with these machines.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. A device for synchronizing a driven primary shaft with a frictionally driven secondary shaft, which device comprises a coupling member connectable to said primary shaft to be driven thereby, drive means driven by said coupling member, a support, a stub shaft journalled on said support, means for mounting said support over said secondary shaft with said stub shaft in axial alignment with the secondary shaft, means drivingly connecting said drive means with said stub shaft, a crank arm on the end of said stub shaft adjacent the secondary shaft, a pawl pivotally mounted on the end of said crank arm, means carried by said arm normally retaining said pawl radially of said stub-shaft but permitting pivotal movement of said pawl toward the normal direction of rotation of said crank arm, a pin including means for mounting said pin on the secondary shaft to be engaged by said pawl when the pawl revolves faster than said pin and to pivot said pawl out of its path upon continued rotation of the secondary shaft after the crank arm has stopped, and a friction clutch drivingly connecting said arm and said stub shaft to permit relative rotation therebetween if movement of the pin is retarded.

2. A device for synchronizing a driven shaft of a motion picture projector with a sound apparatus shaft which is frictionally driven and which carries a take-up reel, which device comprises coupling means connectable to said projector shaft to be driven thereby, a support, a stub shaft journalled on said support, means for mounting said support over said take-up reel with said stub shaft in axial alignment with the reel supporting shaft, means drivingly connecting said coupling means with said stub shaft, a crank arm on the end of said stub shaft adjacent the take-up reel, a pawl pivotally mounted on the end of said crank arm, means on said arm normally retaining said pawl radially of said stub shaft but permitting pivotal movement of said pawl toward the normal direction of rotation of said crank arm, and a pin attachable to the take-up reel to be engaged by said pawl when the pawl revolves faster than the reel and to pivot said pawl out of its path upon continued rotation of the reel after the crank arm has stopped.

3. In combination with a motion picture projector having a driven shaft and a sound apparatus having a frictionally driven shaft which carries a take-up reel, a synchronizing device comprising a first coupling member secured to and driven by said projector shaft, a second coupling member for cooperation with said first coupling member to be driven thereby, drive means driven by said second coupling member, a support mounted over the take-up reel of said sound apparatus, a stub shaft journalled on said support in axial alignment with the take-up reel shaft, means drivingly connecting said drive means with said stub shaft, a crank arm on the end of said stub shaft, a pawl pivotally mounted on the end of said crank arm, means on said arm normally retaining said pawl substantially radially of said stub shaft but permitting pivotal movement of said pawl toward the normal direction of rotation of said crank arm, a pin on the take-up reel to be engaged by said pawl when the pawl revolves faster than said pin and to pivot said pawl out of its path upon continued rotation of the reel after the crank arm has stopped, and a friction clutch drivingly connecting said crank arm and said stub shaft to permit relative rotation between said arm and said stub shaft if movement of said pin is retarded.

JOHN T. ANDERSON.

References Cited in the file of this patent

UNITED STATES PATENTS

| Number | Name | Date |
|---|---|---|
| 293,957 | Ellrich | Feb. 19, 1884 |
| 791,267 | Jaegers | May 30, 1905 |
| 1,653,843 | Dowey | Dec. 27, 1927 |
| 1,856,886 | Rogers | May 3, 1932 |
| 2,002,111 | Hansen | May 21, 1935 |

FOREIGN PATENTS

| Number | Country | Date |
|---|---|---|
| 3,512 | Great Britain | Feb. 12, 1910 |
| 344,819 | Great Britain | Mar. 5, 1931 |